(12) United States Patent
Marra et al.

(10) Patent No.: US 7,222,994 B2
(45) Date of Patent: May 29, 2007

(54) ILLUMINATION SYSTEM

(75) Inventors: Johannes Marra, Eindhoven (NL); Harald Glaeser, Freiburg (DE)

(73) Assignee: Koninklijke Philips Electronics, N.V., Eindhoven (NL)

(*) Notice: Subject to any disclaimer, the term of this patent is extended or adjusted under 35 U.S.C. 154(b) by 66 days.

(21) Appl. No.: 10/526,921

(22) PCT Filed: Sep. 1, 2003

(86) PCT No.: PCT/IB03/03984

§ 371 (c)(1),
(2), (4) Date: Mar. 8, 2005

(87) PCT Pub. No.: WO2004/025171

PCT Pub. Date: Mar. 25, 2004

(65) Prior Publication Data

US 2006/0044826 A1    Mar. 2, 2006

(30) Foreign Application Priority Data

Sep. 12, 2002  (EP) .................................. 02078759

(51) Int. Cl.
*F21V 5/00* (2006.01)

(52) U.S. Cl. ...................... 362/327; 362/337; 362/355; 362/268

(58) Field of Classification Search ............... 362/337, 362/335, 327
See application file for complete search history.

(56) References Cited

U.S. PATENT DOCUMENTS

| 5,249,104 A | * | 9/1993 | Mizobe ...................... 362/605 |
| 5,396,350 A | * | 3/1995 | Beeson et al. ................ 349/62 |
| 5,839,823 A | * | 11/1998 | Hou et al. ................... 362/327 |
| 6,635,306 B2 | * | 10/2003 | Steckl et al. .................. 427/66 |

* cited by examiner

Primary Examiner—Renee Luebke
Assistant Examiner—Evan Dzierzynski

(57) ABSTRACT

An illumination system comprising, a) a light source; b) a light-directing assembly (1) in close proximity to the light source and comprising a plurality of microprisms (6), each microprism comprising an input surface (7) that admits light radiating from the light source, an output surface (8) distal from and parallel to the input surface (7), and at least one sidewall (9) disposed between and contiguous with the input and output surfaces and forming an obtuse tilt angle with respect to the input surface (7) and further positioned for effecting total reflection of the light rays received by the input surface (7), the sidewalls (9) of the microprisms (6) defining interstitial regions (10) between the microprisms (6); c) at least one blocking means (11) positioned to block the passage of light through the sidewalls (9); and d) an optical means (2, 3, 4) located between the light source and the light-directing assembly (1), with the special feature that e) said optical means (2, 3, 4) comprise a reflective powder (4) to at least substantially shield the blocking means (11) from direct exposure to lig radiated from the light source.

20 Claims, 2 Drawing Sheets

ILLUMINATION SYSTEM

Figure 1:
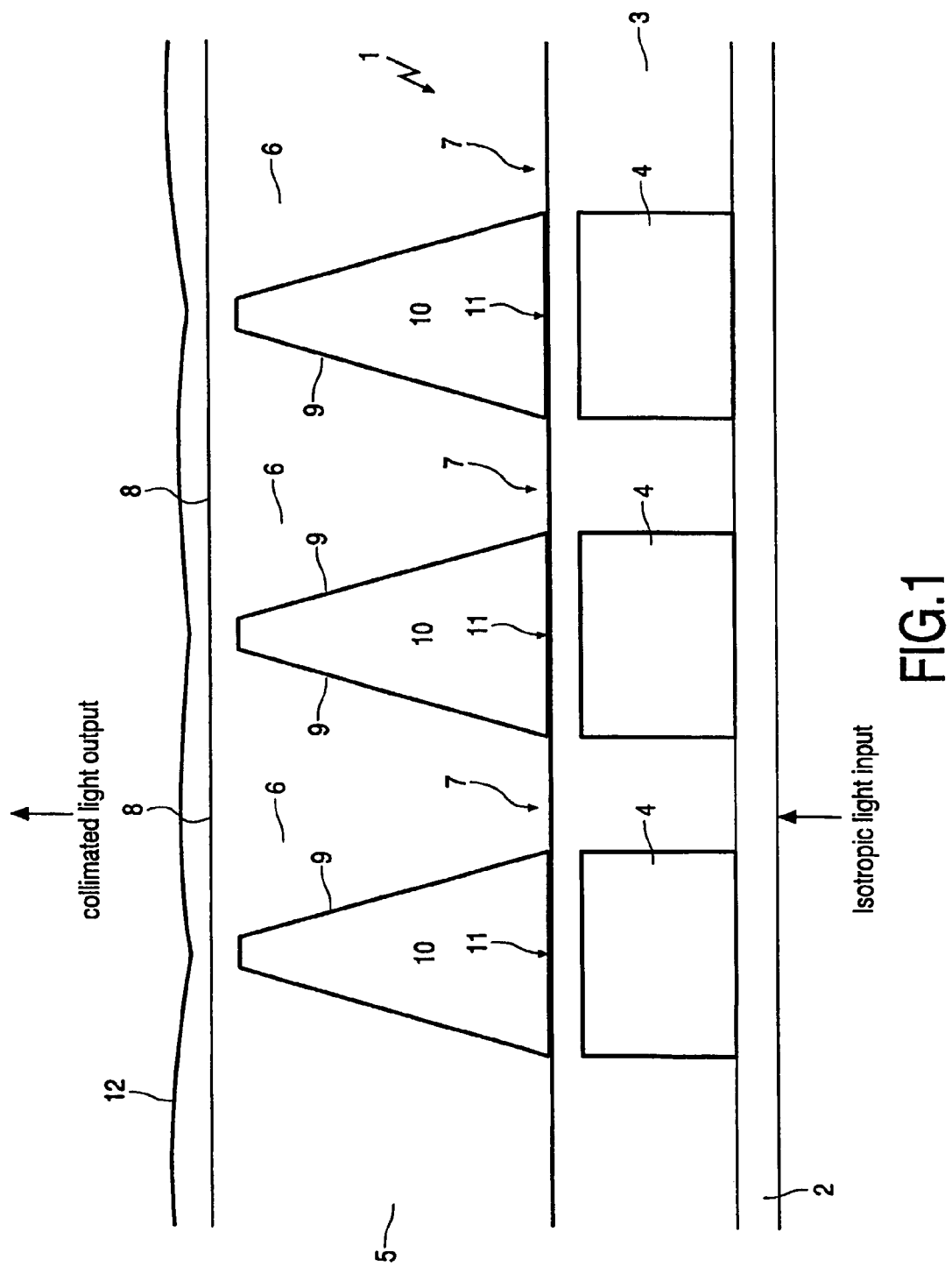

The invention relates to an illumination system comprising:

1. a light source;
2. a light-directing assembly in close proximity to the light source and comprising a plurality of microprisms, each microprism comprising an input surface that admits light radiating from the light source, an output surface distal from and parallel to the input surface, and at least one sidewall disposed between and contiguous with the input and output surfaces and forming an obtuse tilt angle with respect to the input surface and further positioned for effecting total reflection of the light rays received by the input surface, the sidewalls of the microprisms defining interstitial regions between the microprisms;
3. at least one blocking means positioned to block the passage of light through the sidewalls; and
4. an optical means located between the light source and the light-directing assembly.

Such an illumination system is known from U.S. Pat. No. 5,839,823 (Hou et al.). In this known system the light source is formed by an incandescent lamp, a light emitting diode (LED), a metal or halogen high intensity discharge (HID) lamp or a fluorescent lamp etcetera. The microprisms used can have any suitable form, for example conical, polyhedronal, polyhedronal curvilinear or curvilinear. The present invention is not restricted to a specific light source or a specific geometrical shape of the microprisms. The blocking means in this known system serves to block and redirect light rays leaving the light source and reaching the interstitial regions adjacent to the sidewalls of neighbouring microprisms in order to avoid such light rays entering the microprisms through the sidewalls thereof. Distortion of the overall angular light intensity distribution output of the known illumination system is thereby prevented. The blocking means is formed by a highly-reflective solid material filling the interstitial regions and/or covering said sidewalls, thereby reflecting or merely blocking the passage of light rays through the sidewalls. The known optical means (for example, fabricated from a rectangular piece of glass or plastic) located between the light source and the light-directing assembly, serves to reduce the transmission of light from the light source to the light-directing assembly, so that the general output of the light-directing assembly becomes more uniform and glare is minimized.

A disadvantage of the illumination system known from the above United States patent publication is that the so-called "collimation cut-off angle", i.e. the effective angular width of the angular light intensity distribution cannot be sharply defined in the sense that a sharp transition is lacking between the inner angular region within which light is emitted from the illumination system and the outer angular region within which substantially no light is emitted. One reason is that said blocking means exhibits optical coupling with light incident thereon, resulting in an at least partly diffuse reflection from the blocking means which broadens the width of the angular light intensity distribution of the light incident on the input surfaces of the microprisms, leading to a broadening of the angular light intensity distribution of the light emitted from the output surfaces. Another reason is that it is generally very difficult from a practical point of view to provide the interstitial regions with blocking means in a way as to fully prevent the passage of light through the sidewalls while maintaining an efficient light recycling in the illumination system that ensures a maximized lumen output from the illumination system through a minimization of optical absorption losses inside the illumination system.

The object of the invention is to overcome that drawback of the prior art, and in order to accomplish that objective, an illumination system referred to in the introduction is characterized in that said optical means comprise a reflective powder to at least substantially shield the blocking means from direct exposure to light radiated from the light source. This reflective powder is particularly a diffuse reflective dry powder. Thus the powder provides diffuse reflection (i.e. diffuse back-reflection) of light away from the blocking means without absorption losses, so that this light can be subsequently recycled inside the illumination system.

In one preferred embodiment of an illumination system according to the invention said powder, which is in particular of the "free-flowing type", comprises calcium halophosphate, calcium pyrophosphate, $BaSO_4$, $MgO$, $YBO_3$, $TiO_2$ or $Al_2O_3$ particles. Such a powder is resistant against high temperatures, whilst important chemical properties thereof do not deteriorate as a result of being exposed to high temperatures, light and/or moisture.

In another preferred embodiment of an illumination system according to the invention the particles have an average diameter ranging between 0.1 and 100 µm, in particular 5 to 20 µm. In order to obtain a "free-flowing" type powder, said particles are preferably mixed with fine-grained $Al_2O_3$ particles having an average diameter which ranges between 10 and 50 nm. The amount of the latter particles, also known as Alon-C (Degussa, Frankfurt), preferably ranges between 0.1 and 5 wt. %, in particular 0.5 to 3 wt. %.

In another preferred embodiment of an illumination system according to the invention said powder is mixed with colour pigments. This provides the decorative effect whereby it appears as if (partially) coloured light is being emitted by the light source.

In another preferred embodiment of an illumination system according to the invention the powder is incapable of absorbing light, in particular light having a wavelength in the visible wavelength range. Any loss of light in this wavelength range due to absorption is thus prevented.

In another preferred embodiment of an illumination system according to the invention said blocking means is provided on a surface directly adjacent to the sidewalls of neighbouring microprisms. Preferably, this blocking means is provided on selected areas of a side of a support plate extending at least substantially in parallel with the light-directing assembly and positioned in between the light source and the light-directing assembly. The support plate is preferably in optical contact with the input surfaces of the microprisms, whereas said selected areas (provided with the blocking means) are formed by those areas of said side of said support plate that are not in optical contact with said input surfaces, said selected areas facing the interstitial regions. In such a case the blocking means are particularly a non-transmissive layer, preferably a metal layer or a black-absorbing layer.

In another preferred embodiment of an illumination system according to the invention said blocking means is provided on the sidewalls of the microprisms, that is the surface of these sidewalls facing the interstitial regions. Said blocking means is then preferably a metal layer, more in particular selected from the group formed by Al and Ag. Said powder is then contained inside the interstitial regions between the microprisms. In other words, the powder is contained inside an interstitial space bounded by the sidewalls of adjacent microprisms and a side of a support plate extending at least substantially in parallel with the light-directing assembly. This support plate is preferably in optical contact with the input surfaces of the microprisms, wherein the powder fills the entire interstitial regions.

In another preferred embodiment of an illumination system according to the invention said powder is contained in a series of reflector elements supported by a base plate at least substantially extending in parallel with the light-directing assembly, wherein each element is positioned centrally underneath a corresponding interstitial region between adjacent microprisms. In a preferred embodiment the area of each reflector element facing the light source corresponds to the projected cross-section area of a corresponding interstitial region facing the light source, the projection carried out on an imaginary plane extending in parallel with the light-directing assembly at the location of and containing the input surfaces.

In another preferred embodiment of an illumination system according to the invention, the width of the interstitial regions is at least 1 mm, wherein the height thereof is at least 1 mm. Said width is defined as the lateral distance between adjacent input surfaces.

Figure 2:
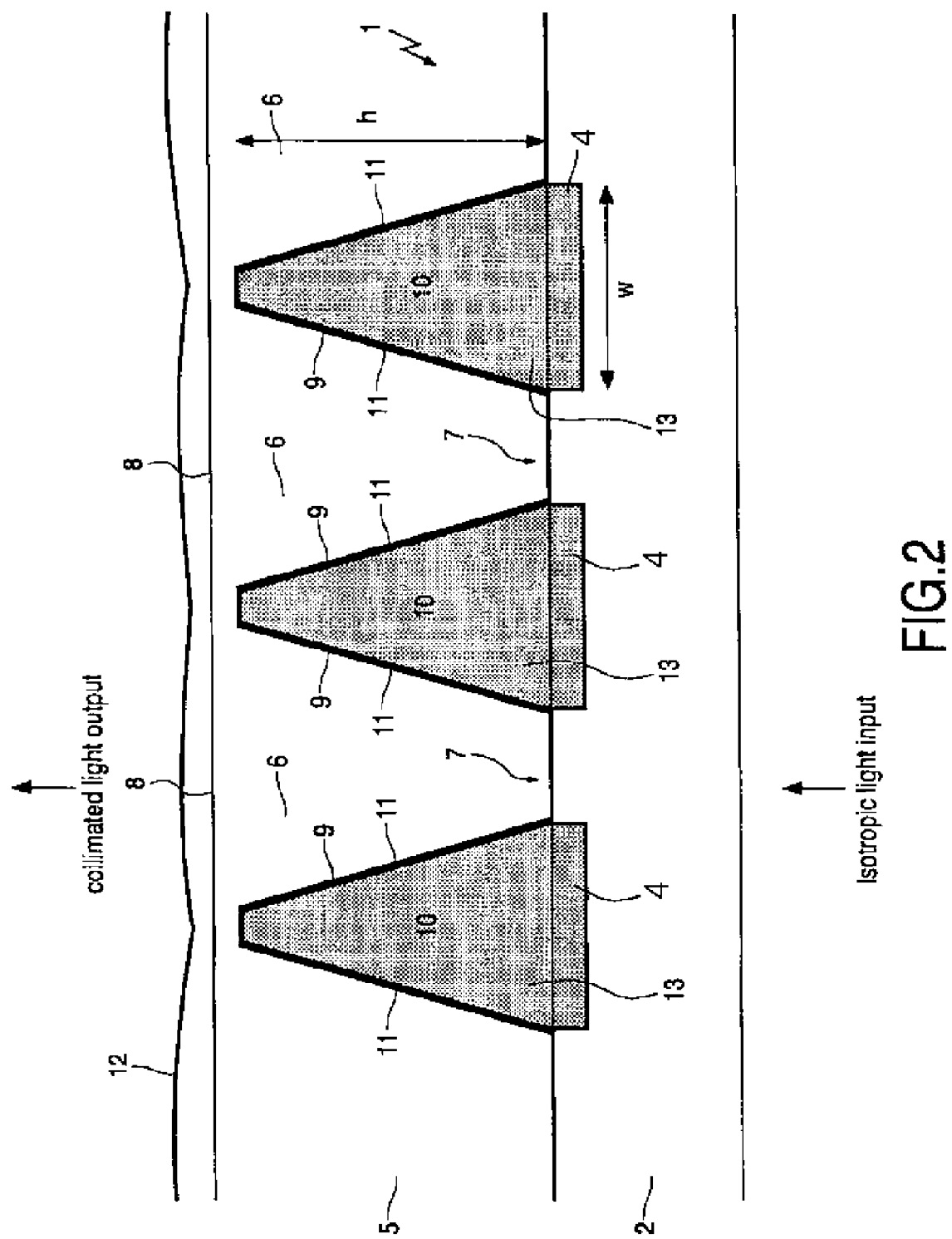

FIG. 1 shows an illumination system provided with a light source for directing isotropic light towards a light-directing assembly; and FIG. 2 shows another preferred embodiment of an illumination system according to the present invention.

The invention will now be explained more in detail with reference to two figures illustrated in a drawing, which figures are a schematic side elevation of a preferred embodiment of an illumination system in accordance with the invention.

In FIG. 1 is shown an illumination system provided with a light source (not shown) for directing isotropic light towards a light-directing assembly 1. Said light-directing assembly 1 consists of a base holding plate 2 carrying a channel plate 3, the latter being made of a transparent resin and being equipped with cavities filled with a "free-flowing" type powder acting as reflector elements 4. This powder comprises calcium halophosphate particles mixed with fine-grained $Al_2O_3$ particles, also known as Alon-C (Degussa, Frankfurt). As can be seen from FIG. 1, the channel plate 3 extends in parallel with a wedge plate 5. The wedge plate 5 comprises a plurality of microprisms 6 made of a photo-polymerisable resin, each microprism 6 comprising an input surface 7 that admits light radiating from the light source (not shown), an output surface 8 distal from and parallel to the input surface 7, and at least one sidewall 9 disposed between and contiguous with the input and output surfaces 7,8 and forming an obtuse tilt angle with respect to the input surface 7 and further positioned for effecting total reflection of the light rays received by the input surface 7. The sidewalls 9 of the microprisms 6 bound interstitial regions 10 filled with air between the microprisms 6. The channel plate 3 comprises selected areas provided with absorbing black layers 11 facing the interstitial regions 10 as shown. The layers 11 serve as blocking means in order to block and absorb light rays leaving the light source (not shown), thereby preventing them to reach the interstitial regions 10 adjacent to the sidewalls 9 of the microprisms 6, in order to avoid such light rays entering the microprisms 6 through the sidewalls 9 thereof. A widening of the angular light intensity distribution within which light is emitted from the output surfaces is thus prevented. A lens foil 12 is mounted to further collimate the light output.

The reflector elements 4 filled with said powder serve to substantially shield the absorbing layers 11 from direct exposure to light radiated from the light source (not shown), and reflect light away from them so that a high lumen output from the illumination system can be maintained through minimised optical absorption losses. As such, the absorbing black layers constitute a last rigorous line of defence against light rays entering the microprisms through the sidewalls thereof, while the powder present inside the reflector elements serves to maximise the lumen output from the illumination system.

FIG. 2 relates to another preferred embodiment of an illumination system according to the invention, wherein parts that correspond to those in FIG. 1 are designated with the same reference numerals. A channel plate 3 with reflector elements 4 is now absent, as the reflective (diffuse) powder 13 is now present in the interstitial regions 10 and a Al or Ag layer 11 is put onto the sidewalls 9. The height and width of the interstitial regions 10 are designated by h and w, respectively, and amount to 1 mm or more in order to facilitate filling with the power 13.

The invention claimed is:

1. An illumination system comprising:
   a. a light source;
   b. a light-directing assembly in close proximity to the light source and comprising a plurality of microprisms, each microprism comprising an input surface that admits light radiating from the light source, an output surface distal from and parallel to the input surface, and at least one sidewall disposed between and contiguous with the input and output surfaces and forming an obtuse tilt angle with respect to the input surface and further positioned for effecting total reflection of the light rays received by the input surface, the sidewalls of the microprisms defining interstitial regions between the microprisms;
   c. at least one blocking means positioned to block the passage of light through the sidewalls; and
   d. an optical means located between the light source and the light-directing assembly, characterized in that
   e. said optical means comprise a reflective powder to at least substantially shield the blocking means from direct exposure to light radiated from the light source.

2. An illumination system according to claim 1, wherein the reflective powder is a diffuse reflective powder.

3. An illumination system according to claim 2, wherein said powder comprises calcium halophosphate, calcium pyrophosphate, $BaSO_4$, $MgO$, $YBO_3$, $TiO_2$ or $Al_2O_3$ particles.

4. An illumination system according to claim 3, wherein the particles have an average diameter ranging between 0.1 and 100 μm, in particular 5 to 20 μm.

5. An illumination system according to claim 3, wherein said particles are mixed with fine-grained $Al_2O_3$ particles having an average diameter which ranges between 10 and 50 nm.

6. An illumination system according to claim 5, wherein the amount of fine-grained Al2O3 particles having an average diameter ranging between 10 and 50 nm ranges between 0.1 and 5 wt. %, in particular 0.5 to 3 wt. %.

7. An illumination system according to claim 1, wherein said powder is mixed with colour pigments.

8. An illumination system according to claim 1, wherein the powder at least is incapable of absorbing light, in particular light having a wavelength in the visible wavelength range.

9. An illumination system according to claim 1, wherein said blocking means is provided on a surface directly adjacent to the sidewalls of neighbouring microprisms.

10. An illumination system according to claim 9, wherein said blocking means comprises a black-absorbing layer or a metal layer, preferably selected from the group formed by Al and Ag.

11. An illumination system according to claim 1, wherein said blocking means is provided on the sidewalls of the microprisms.

12. An illumination system according to claim 11, wherein said blocking means comprises a metal layer, preferably selected from the group formed by Al and Ag.

13. An illumination system according to claim 11, wherein said powder is contained in the interstitial regions between the microprisms.

14. An illumination system according to claim 1, wherein said powder is contained in a series of reflector elements supported by a base plate at least substantially extending in parallel with the light-directing assembly and wherein each element is positioned centrally underneath a corresponding interstitial region between adjacent microprisms.

15. An illumination system according to claim 14, wherein the area of each reflector element facing the light source corresponds to the projected cross-section area of a corresponding interstitial region facing the light source, the projection carried out on an imaginary plane extending in parallel with the light-directing assembly at the location of and containing the input surfaces.

16. An illumination system according to claim 1, wherein the width of the interstitial regions is at least 1 mm and wherein the height thereof is at least 1 mm.

17. An illumination system comprising:
 a wedge plate having a plurality of microprisms, adjacent microprisms of the plurality of microprisms forming interstitial regions between the adjacent microprisms;
 a channel plate parallel the wedge plate, the channel plate forming a plurality of reflective elements filled with free-flowing reflective powder; and
 a plurality of absorbing black layers;
 wherein each of the interstitial regions is aligned with one of the plurality of reflective elements and one of the plurality of absorbing black layers is disposed between one of the plurality of reflective elements and the aligned interstitial region.

18. An illumination system according to claim 17, wherein the plurality of absorbing black layers are disposed on the channel plate.

19. An illumination system according to claim 17, wherein each of the interstitial regions is filled with air.

20. An illumination system comprising:
 a wedge plate having a plurality of microprisms, adjacent microprisms of the plurality of microprisms forming interstitial regions between the adjacent microprisms, the plurality of microprisms having sidewalls facing the interstitial regions;
 a base holding plate parallel the wedge plate, the base holding plate forming a plurality of reflective elements, each of the plurality of reflective elements being in communication with one of the interstitial regions, the plurality of reflective elements and the interstitial regions being filled with free-flowing reflective powder; and
 a plurality of absorbing black layers disposed on the sidewalls.

\* \* \* \* \*